United States Patent [19]
Mark et al.

[11] Patent Number: 5,822,065
[45] Date of Patent: Oct. 13, 1998

[54] CONICALLY ARRANGED FIBER OPTIC GYROSCOPE COILS

[75] Inventors: John G. Mark, Pasadena; Daniel A. Tazartes; Amado Cordova, both of West Hills; Agop H. Cherbettchian, Santa Monica, all of Calif.

[73] Assignee: Litton Systems, Inc., Woodland Hills, Calif.

[21] Appl. No.: 873,349

[22] Filed: Jun. 11, 1997

Related U.S. Application Data

[60] Provisional application No. 60/022,679 Jul. 26, 1996.
[51] Int. Cl.$^6$ .................................................. G01C 19/72
[52] U.S. Cl. ........................................................ 356/350
[58] Field of Search .................................... 356/350, 345; 250/227.19, 227.27; 385/12; 242/333.6

[56] References Cited

U.S. PATENT DOCUMENTS 4,781,461  11/1988  Baron et al. ............................ 356/350
5,545,892   8/1996  Bilinski et al. ..................... 250/231.12
5,552,887   9/1996  Dyott .................................... 356/350

*Primary Examiner*—Samuel A. Turner
*Attorney, Agent, or Firm*—Lewis B. Sternfels; Gerald L. Cline

[57] ABSTRACT

A gyroscope component (10) and its variations (10a, 10b and 10c) includes a spool (12, 12a) which supports a ring-shaped fiber optic gyroscope coil (14). The spool has a base (26, 26a) which is provided with a central hole (38, 38a). A perpendicularly extending tubular wall (28, 28a) extends from the base or a cover (16, 16a), and may directly contact the coil or be separated therefrom by a non-adhesive material (29) or a space (30). The cover covers the spools and, with the spool and the tubular wall, forms a ring-shaped enclosure. Each coil has a generally trapezoidal shape and comprises an optical fiber winding wound about an axis and having a cross-sectional configuration that approximates a 45° right triangle whose hypotenuse is formed by the sloped sides to provide a side which is sloped with respect to its axis. Three components (10, 10", 10''') are positioned respectively about three orthogonally disposed axes to form an assembly (50) and are supported within and enclosed by a housing (52). The arrangement of the enclosures positions the coils such that their sloped hypotenuse sides face one another. The spool (12, 12a), the cover (16, 16a), the tubular wall (28, 28a) and the housing (52) are formed of a ferromagnetic material having high relative ($\mu/\mu 0$) permeability.

19 Claims, 3 Drawing Sheets

CONICALLY ARRANGED FIBER OPTIC GYROSCOPE COILS

CROSS-REFERENCE TO RELATED APPLICATION

This application claims the benefit of U.S. Provisional application No. 60/022,679, filed 26 Jul. 1996.

REFERENCE REGARDING FEDERAL SPONSORSHIP

Not Applicable

REFERENCE TO MICROFICHE APPENDIX

Not Applicable

1. Field of the Invention

The present invention relates to fiber optic gyroscopes and, in particular, to a compact arrangement of three fiber optic coils of unique conical configuration.

2. Description of Related Art and Other Considerations

Size is an important consideration for inertial navigation systems; therefore, the smallest possible size unit is the preferred choice. Contrary to the advantages of reduced size, gyroscope performance may be improved with the employ of some larger sized components. Specifically, conventional fiber optic gyroscopes use fiber optic gyroscope coils wound in a cylindrical fashion. When several coil cylinders of conventional cylindrical configuration, usually three in a navigation system, are packed together, their heights add to the overall diameter and size, in determining the overall package dimensions. Accordingly, a smaller package size is a desirable goal.

SUMMARY OF THE INVENTION

These and other problems and concerns are successfully addressed and overcome by the present invention. Briefly, three coils, for each of the orthogonally disposed x, y and z axes, are conically wound and packaged with their conical or sloped sides facing one another. Being determined only by the sensor diameter, such conically wound coils provide the desired smaller package size.

Several advantages are derived from the above construction. The Sagnac scale factor, which relates the signal output of the gyros to the applied angular rate, can be improved over cylindrical coils constrained to fit within the same cluster envelope and, hence, performance for a given size can be improved. Higher mechanical resonant frequencies relative to cylindrical coils and lower vibration Shupe effect, which causes an undesirable gyro output in response to vibration, are achieved. The coils are easier to wind with less winding defects when using a properly shaped guide. Magnetic shielding using a conical cover is improved relative to a cylindrical cover with sharp corners, for example, as described in the co-pending patent application entitled "High Efficiency Magnetic Shield" (Litton Docket No. GCD 95-16-US) by inventors John G. Mark, Daniel A. Tazartes, Amado Cordova, Agop H. Cherbettchian and Eric L. Goldner.

Other aims and advantages, as well as a more complete understanding of the present invention, will appear from the following explanation of exemplary embodiments and the accompanying drawings thereof.

BRIEF DESCRIPTION OF THE DRAWINGS

FIG. 3 is differentiated from FIG. 3a in that the former figure shows the tubular wall secured to a spool, while the latter figure shows the tubular wall secured to a cover. FIGS. 3 and 3a are differentiated from FIG. 3b in that non-adhesive matter exists between the coil and the tubular wall. FIGS. 3 and 3a are differentiated from FIG. 3c in that a space exists between the coil and the tubular wall.

DETAILED DESCRIPTION

Figure 1:
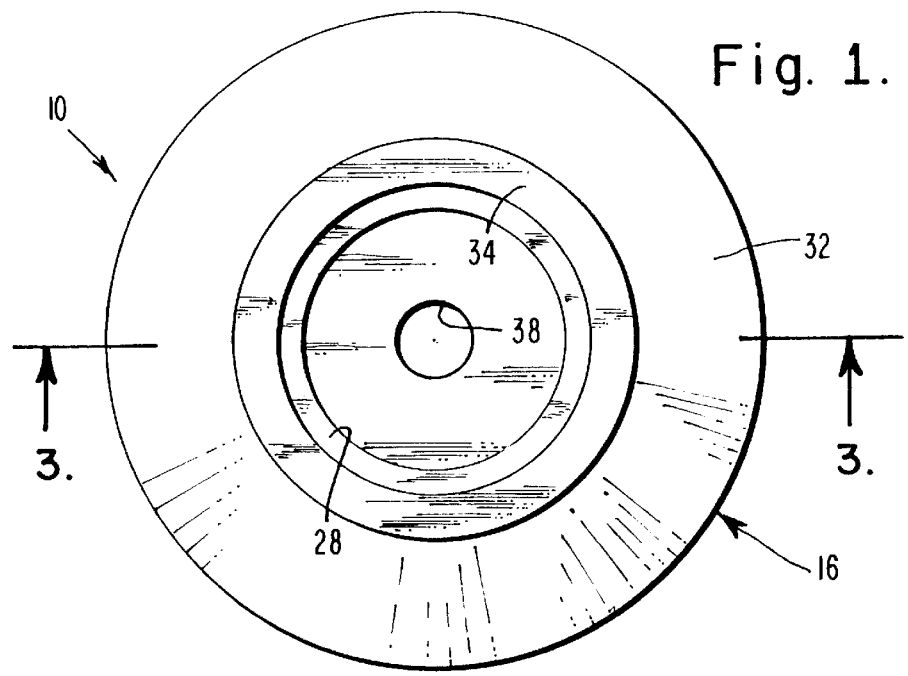
FIG. 1 is an elevational view of an exemplary coil component usable in the present invention.
Figure 2:
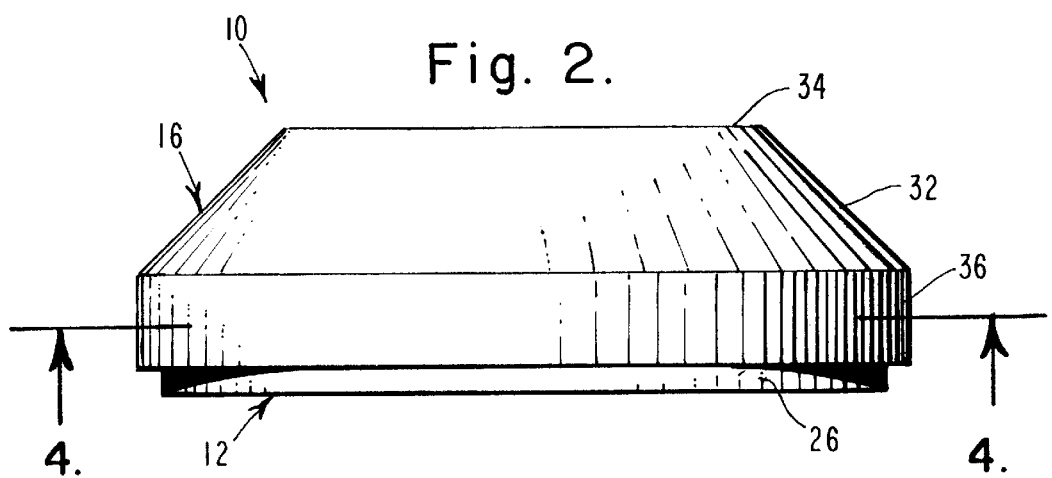
FIG. 2 is a side elevational view of the coil component shown in FIG. 1.

FIGS. 1–4 depict a gyroscope component 10, and embodiments 10a, 10b and 10c thereof, which are representative of gyroscope components 10', 10" and 10''' shown in FIG. 5 and described more fully hereinafter. Gyroscope component 10 includes a spool 12 or 12a, a coil 14 of optical fibers, and a cover 16 or 16a, all centered about an axis 18. Coil 14 comprises windings of optical fiber and, although the coil is of conventional construction, its shape is not conventional. Specifically, as shown in FIGS. 3, 3a, 3b, 3c and 4, coil 14 is generally trapezoidal in cross-section, more specifically having a right triangle configuration with a pair of sides 20 and 22 and a hypotenuse side 24. To help maintain the integrity of the coiled fibers from separation or deformation, the triangular corner intersections of sides 20 and 22 with hypotenuse 24 are cut off to form boundary faces 25 and 25'. Therefore, the cross-sectional configuration of coil 14 is not rectangularly shaped as is conventional. The trapezoidal cross-section of coil 22 approximates a 45° right triangle for optimum packaging; however, other angles are also possible.

Coil 14 is supported on spool 12 or 12a, which may be configured as illustrated in FIGS. 3, 3a, 3b and 3c. The spools respectively include a base 26 or 26a to which the spools at their side 20 are secured by a suitable adhesive 27 or the like of conventional composition. In the embodiments depicted in FIGS. 3, 3b and 3c, a tubular wall 28 extends from base 26. In the FIG. 3a embodiment, a tubular wall 28a extends from outer edge portion 34a of cover 16a, rather than from spool 12 of FIGS. 3, 3b and 3c.

Figure 3:
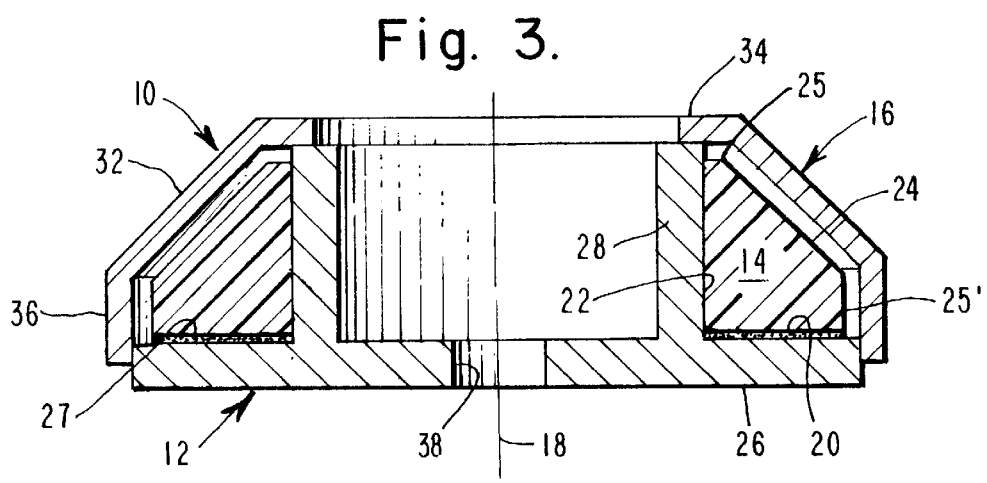
FIGS. 3, 3a, 3b and 3c are cross-sectional views of alternative embodiments of the coil component illustrated in FIG. 1 taken along line 3—3 thereof.
Figure 3A:
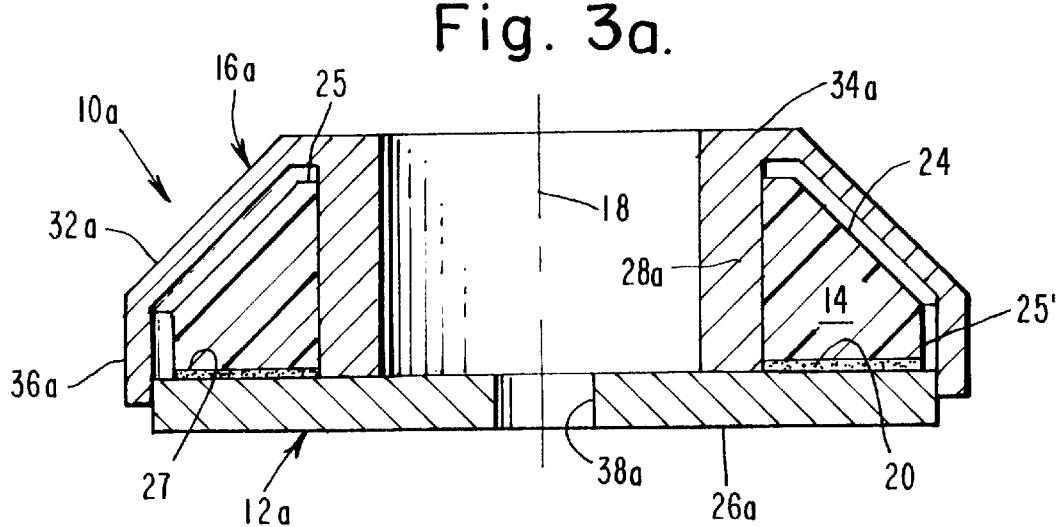
Figure 3B:
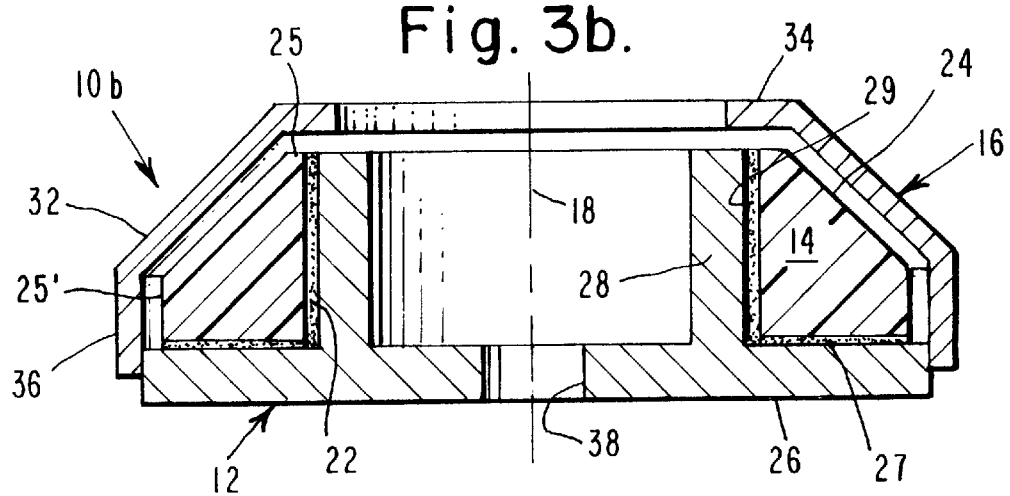

If desired, as shown in FIG. 3b, generally non-adhesive matter 29 may be disposed between tubular wall 28 or 28a and coil 14. Such non-adhesive matter is characterized by a low coefficient of friction, and is described in U.S. Pat. No. 5,545,892 for the reasons given therein; the disclosure in that patent is incorporated herein as if set forth in haec verba. Briefly, a spool for receiving the coil includes a single, substantially-planar mounting flange and a central hub. The coil can be directly wound upon the hub. The coil is mounted transverse to the plane of the mounting flange and is unconfined in that direction as the surface of the hub is substantially non-adhesive with respect to the inner layer of the coil. This allows axial coil expansion with increases in temperature without generating gyro bias errors.

Figure 3C:
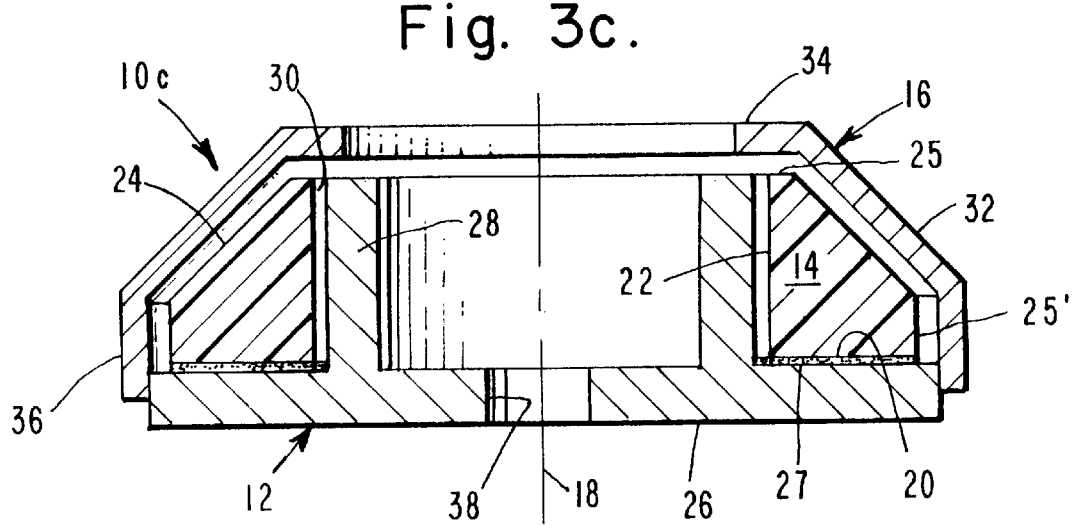
Figure 4:
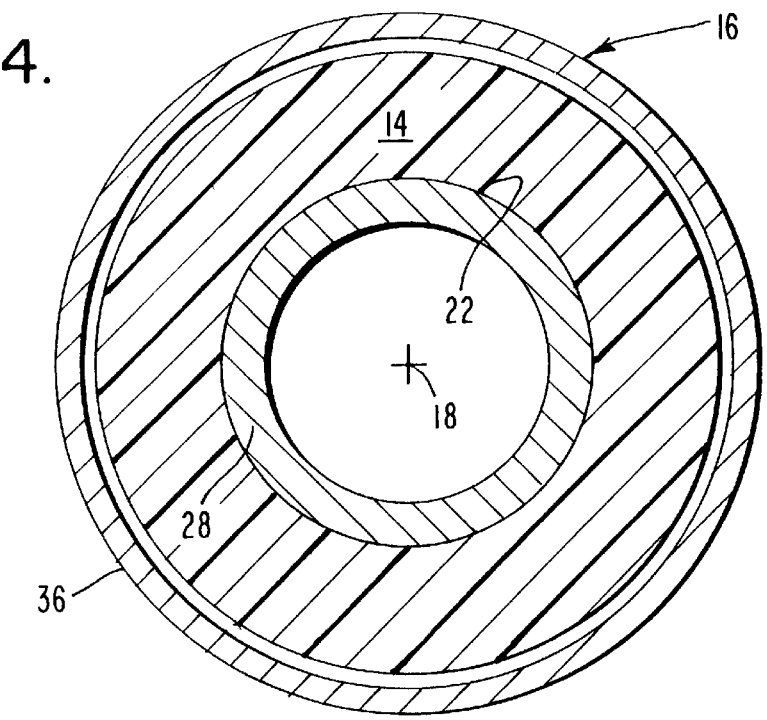
FIG. 4 is a cross-sectional view of the coil component depicted in the embodiment of FIG. 3 taken along line 4—4 of FIG. 2.

Alternately, as shown in FIG. 3c, tubular wall 28 or 28a may be spaced from coil 14. The use of a space is described in patent application, Ser. No. 08/526,725 for the reasons given therein, and the disclosure in that patent is incorporated herein as if set forth in haec verba.

Covers 16 and 16a are shaped to conform to the triangular cross-section of coil 14, and include a sloped center segment 32, 32a extending into circular inner and outer edge portions 34, 34a and 36, 36a. Center segment 32, 32a is generally parallel to hypotenuse side 24 of coil 14, while inner and outer edge portions 34, 34a and 36, 36a are respectively perpendicular and parallel to axis 18, although this arrangement is not critical. Clearly, the triangular cross-section, when revolved around center axis 18, forms a conical shape.

All spools 12 and 12a and covers 16 and 16a are formed preferably of a ferromagnetic material having high relative ($\mu/\mu0$) permeability. Preferred high permeability materials include alloys of Carpenter High Permeability "49"® and Carpenter HyMu "80"® (trademarks of Carpenter Technology Corporation) whose compositions are respectively a 48% nickel-iron alloy and an unoriented 80% nickel-iron-molybdenum alloy.

Bases 26 and 26a of their respective spools are each provided with a central hole 38 and 38a. Hole 38, 38a forms an opening for receipt of a mounting bolt or other supporting means, to enable the coil component to be mounted in the multiple axis assembly shown in FIG. 5.

Figure 5:
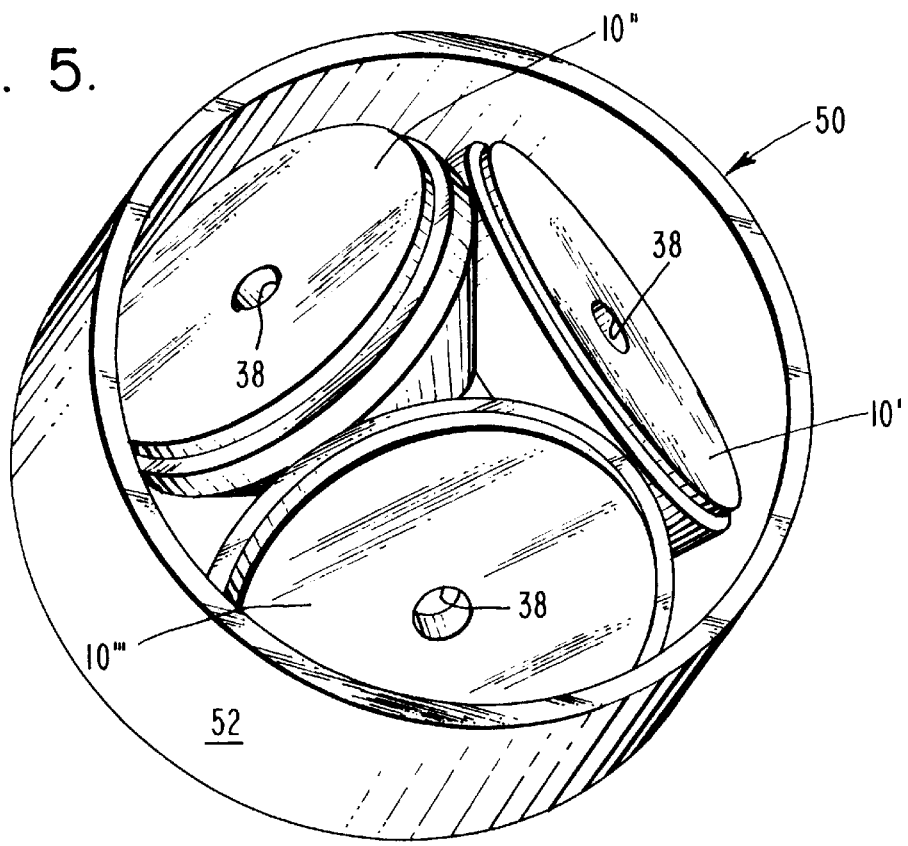
FIG. 5 is a perspective view of three conically shaped coils, such as previously depicted, which are arranged and packaged for use in a three axis fiber optic gyroscope assembly.

Referring now to FIG. 5, an assembly 50 is formed from three gyroscope components 10', 10" and 10"' constructed as described with respect to FIGS. 1–4. Fiber optic gyroscope components 10', 10" and 10"' are mounted within a housing or case 52, and their axes are arrayed orthogonally to one another. Because center segment 32 (32a) of cover 16 (16a), which is parallel to hypotenuse 24 of coil 14, is at a 45° angle to axis 18, when all coil components 10', 10" and 10"' are arranged as shown in FIG. 5, their respective center segment sides 32 (32a) permit the three components to be positioned closely to one another in a compact arrangement. For extremely high shielding requirements, outer case or housing 52 is formed of high permeability ferromagnetic material as discussed further immediately below.

Specifically, the composition of housing 52, like spool 12 (12a) and cover 16, is chosen from a variety of materials which are selected for their thermal expansion properties. Therefore, the materials include high nickel content iron alloys, such as Carpenter HyMu "80"® and Carpenter High Permeability "49"®.

Although the invention has been described with respect to particular embodiments thereof, it should be realized that various changes and modifications may be made therein without departing from the spirit and scope of the invention.

What is claimed is:

1. A fiber optic gyroscope including a support and a coil of optical fibers supported thereby, said coil having a generally trapezoidal cross-sectional configuration.

2. A fiber optic gyroscope according to claim 1 wherein said generally trapezoidal cross-sectional configuration includes parallel sides in which one of said sides is shorter than the other.

3. A fiber optic gyroscope according to claim 2 further including an interior portion surrounded by said coil and a cover covering said support, in which said support, said interior portion and said cover comprise ferromagnetic material having high relative ($\mu/\mu0$) permeability.

4. An optical gyroscope according to claim 3 wherein said support comprises a spool including a base which is provided with a central hole, and said interior portion comprises a tubular wall extending perpendicularly between said base and said cover to form a ring-shaped enclosure with said spool and said cover, thereby encasing said coil in said high permeability material.

5. An optical gyroscope according to claim 4 further including generally non-adhesive matter disposed between said tubular wall and said coil.

6. A fiber optic gyroscope according to claim 4 in which said tubular wall is spaced from said coil.

7. A fiber optic gyroscope according to claim 4 in which said tubular wall is secured to said spool.

8. A fiber optic gyroscope according to claim 4 in which said tubular wall is secured to said cover.

9. A fiber optic gyroscope assembly including:
   at least first and second fiber optic coils, each said coil comprising an optical fiber winding wound about an axis to provide a side sloped with respect to its axis; and
   an arrangement positioning said coils such that their sloped sides face one another.

10. An assembly according to claim 9 further including a third fiber optic coil configured similarly as said first and second coils, all said windings respectively having cross-sectional configurations that approximate 45° right triangles whose hypotenuses are formed by said sloped sides.

11. An assembly according to claim 10 in which said coils are positioned respectively about three orthogonally disposed axes.

12. An assembly according to claim 11 further including a housing of a ferromagnetic material having high relative ($\mu/\mu0$) permeability enclosing said three coils.

13. A fiber optic gyroscope assembly including:
   three spools of ferromagnetic material having high relative ($\mu/\mu0$) permeability and each including a base which is provided with a central hole;
   covers of a ferromagnetic material having high relative ($\mu/\mu0$) permeability and disposed to respectively cover said spools;
   tubular walls of a ferromagnetic material having high relative ($\mu/\mu0$) permeability and disposed to extend between respective ones of said bases and said covers, to form therewith ring-shaped enclosures; and
   three ring-shaped fiber optic gyroscope coils respectively disposed in said enclosures and about said tubular walls for encasement by said high permeability material, said fiber optic coils being positioned respectively about three orthogonally disposed axes, each said coil comprising an optical fiber winding wound about an axis and having a cross-sectional configuration that approximates a 45° right triangle whose hypotenuse is formed by said sloped sides to provide a side sloped with respect to its axis;
   an arrangement of said enclosures positioning said coils such that their sloped hypotenuse sides face one another; and
   a housing of a ferromagnetic material having high relative ($\mu/\mu0$) permeability enclosing said three coils.

14. A fiber optic gyroscope according to claim 13 in which said tubular structures are respectively secured to said spools.

15. An assembly according to claim 14 further including generally non-adhesive matter disposed between said tubular structure and said coil.

16. A fiber optic gyroscope according to claim 14 in which each of said tubular structures are respectively spaced from said coils.

17. A fiber optic gyroscope according to claim 13 in which said tubular structures are respectively secured to said covers.

18. An assembly according to claim 17 further including generally non-adhesive matter disposed between said tubular structure and said coil.

19. A fiber optic gyroscope according to claim 17 in which said tubular structures are respectively spaced from said coils.

* * * * *